(12) United States Patent
Sudbrink et al.

(10) Patent No.: US 9,924,621 B2
(45) Date of Patent: *Mar. 27, 2018

(54) LIFT SYSTEM FOR AN AGRICULTURAL TILLAGE IMPLEMENT

(71) Applicant: CNH INDUSTRIAL CANADA, LTD., Saskatoon (CA)

(72) Inventors: Matthew R. Sudbrink, Metamora, IL (US); Dean A. Knobloch, Tucson, AZ (US); Anthony Carbaugh, Washington, IL (US); James W. Henry, Saskatoon (CA)

(73) Assignee: CNH Industrial Canada, Ltd., Saskatoon, Saskatchewan (CA)

( * ) Notice: Subject to any disclaimer, the term of this patent is extended or adjusted under 35 U.S.C. 154(b) by 455 days.

This patent is subject to a terminal disclaimer.

(21) Appl. No.: 14/540,801

(22) Filed: Nov. 13, 2014

(65) Prior Publication Data

US 2015/0129255 A1    May 14, 2015

Related U.S. Application Data

(60) Provisional application No. 61/903,529, filed on Nov. 13, 2013.

(51) Int. Cl.
    *A01B 63/22*            (2006.01)
    *A01B 3/26*             (2006.01)
    *A01B 73/04*            (2006.01)

(52) U.S. Cl.
    CPC ............... *A01B 3/26* (2013.01); *A01B 63/22* (2013.01); *A01B 73/044* (2013.01); *A01B 73/046* (2013.01)

(58) Field of Classification Search
    CPC ..................................................... A01B 63/22
    USPC ............................. 172/400, 406, 4, 239, 423
    See application file for complete search history.

(56) References Cited

U.S. PATENT DOCUMENTS

| | | | | |
|---|---|---|---|---|
| 4,655,296 A | * | 4/1987 | Bourgault ............. | A01B 63/22 172/400 |
| 4,712,622 A | * | 12/1987 | Birkenbach et al. .. | A01B 63/22 172/328 |
| 5,409,069 A | * | 4/1995 | Hake ..................... | A01B 63/22 172/328 |
| 5,957,218 A | * | 9/1999 | Noonan ................. | A01B 63/10 172/239 |
| 6,397,953 B1 | * | 6/2002 | Ankenman ............ | A01B 51/04 172/445.1 |

(Continued)

*Primary Examiner* — Thomas B Will
*Assistant Examiner* — Joel F. Mitchell
(74) *Attorney, Agent, or Firm* — Rebecca L. Henkel; Rickard K. DeMille

(57) ABSTRACT

An agricultural tillage implement includes a main section including a hitch extending in a travel direction, a plurality of foldable wing sections coupled with the main section, a plurality of ground engaging tilling elements, and a plurality of lift and gauge wheel lift mechanisms. The tilling elements are coupled to the main section and wing sections. Each of the lift and gauge wheel lift mechanisms has a rear lift wheel actuator and a front gauge wheel actuator. A control system is configured to independently actuate the rear lift wheel actuators and the front gauge wheel actuators to control a depth of tilling elements in each of the sections when the implement is in a field configuration, and to level the implement front to rear and side to side.

16 Claims, 13 Drawing Sheets

(56) References Cited

U.S. PATENT DOCUMENTS

| | | | | |
|---|---|---|---|---|
| 6,401,832 B1* | 6/2002 | Payne | ............... | A01B 63/22 172/238 |
| 6,698,523 B2* | 3/2004 | Barber | ............... | A01B 63/22 172/239 |
| 2012/0261145 A1* | 10/2012 | Palen | ............... | A01B 63/22 172/1 |
| 2015/0129259 A1* | 5/2015 | Sudbrink et al. | ...... | A01B 63/22 172/407 |
| 2016/0249521 A1* | 9/2016 | Sudbrink et al. | ...... | A01B 63/22 172/407 |

* cited by examiner

LIFT SYSTEM FOR AN AGRICULTURAL TILLAGE IMPLEMENT

CROSS REFERENCE TO RELATED APPLICATIONS

This is a non-provisional application based upon U.S. provisional patent application Ser. No. 61/903,529, entitled "AGRICULTURAL TILLAGE IMPLEMENT WHEEL CONTROL", filed Nov. 13, 2013, which is incorporated herein by reference.

BACKGROUND OF THE INVENTION

1. Field of the Invention

The present invention relates to agricultural implements, and, more particularly, to agricultural tillage implements.

2. Description of the Related Art

Farmers utilize a wide variety of tillage implements to prepare soil for planting. Some such implements include two or more sections coupled together to perform multiple functions as they are pulled through fields by a tractor. For example, a field cultivator is capable of simultaneously tilling soil and leveling the tilled soil in preparation for planting. A field cultivator has a frame that carries a number of cultivator shanks with shovels at their lower ends for tilling the soil. The field cultivator converts compacted soil into a level seedbed with a consistent depth for providing excellent conditions for planting of a crop. Grass or residual crop material disposed on top of the soil is also worked into the seedbed so that it does not interfere with a seeding implement subsequently passing through the seedbed.

Tillage equipment prepares the soil by way of mechanical agitation of various types, such as digging, stirring, and overturning. Examples of which include ploughing (overturning with moldboards or chiseling with chisel shanks), rototilling, rolling with cultipackers or other rollers, harrowing, and cultivating with cultivator shanks.

Tillage is often classified into two types, primary and secondary. There is no strict definition of these two types, perhaps a loose distinction between the two is that tillage that is deeper and more thorough is thought of as primary, and tillage that is shallower is thought of as secondary. Primary tillage such as plowing produces a larger subsurface difference and tends to produce a rough surface finish, whereas secondary tillage tends to produce a smoother surface finish, such as that required to make a good seedbed for many crops. Harrowing and rototilling often combine primary and secondary tillage into one operation.

Wheels are often integral with tillage implements and are used for both transportation of the implement, and for depth control of the tilling elements. The prior art includes control systems that raise and lower the implement as an entire unit, which can result in uneven tillage across the implement width of today's wider equipment. What is needed in the art is an easy to use mechanism for depth control and levelling of an agricultural tillage implement.

SUMMARY OF THE INVENTION

The present invention provides a tillage implement that has several tilling sections with the ability to independently control the depth and levelling of the tilling elements of the various sections.

The invention in one form is directed to an agricultural tillage implement that includes a center frame section having a pull hitch extending in a travel direction, a plurality of foldable wing sections coupled with the center frame section, a plurality of ground engaging tilling elements, and a plurality of lift and gauge wheel lift mechanisms. The tilling elements are coupled to the center frame section and to the foldable wing sections. Each of the lift and gauge wheel lift mechanisms has a rear lift wheel actuator, a rear lift wheel linkage linked to the rear lift wheel actuator, and at least one rear lift wheel connected to the rear lift wheel linkage. Another actuator, the front gauge wheel actuator, is also connected to the rear lift wheel linkage, and is itself linked to at least one front gauge wheel. In this way, the rear lift wheel actuators can raise and lower the frame sections, while the front gauge wheel actuator can be used for front to rear levelling.

The invention in another form is directed to a lift and gauge wheel lift mechanism that includes a rear lift wheel actuator, a rear lift wheel linkage linked to the rear lift wheel actuator, and at least one rear lift wheel connected to the rear lift wheel linkage. Another actuator, the front gauge wheel actuator, is also connected to the rear lift wheel linkage, and is itself linked to at least one front gauge wheel. In this way, the rear lift wheel actuators can raise and lower the frame sections, while the front gauge wheel actuator can be used for front to rear levelling.

The invention in yet another form is directed to a control system of an agricultural tillage implement having a center frame section, a plurality of foldable wing sections coupled with the center frame section, at least one ground engaging tilling element coupled to each of the center frame section and to each of the plurality of foldable wing sections, and at least one rear lift wheel and at least one front gauge wheel attached to at least one of the center frame section and the plurality of foldable wing sections. The control system has a rear lift wheel linkage linked to at least one rear lift wheel and connected to a rear lift wheel actuator. The control system also has at least one front gauge wheel linked to a front gauge wheel actuator which is connected to the rear lift wheel linkage. The control system includes a controller that independently controls the rear lift wheel actuator and the front gauge wheel actuator. In this way, the rear lift wheel actuators can raise and lower the frame sections, while the front gauge wheel actuator can be used for front to rear levelling.

An advantage of the present invention is that the depth of tillage performed by the implement can be controlled, as well as its front to rear and side to side levelling in a dynamic manner.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates embodiment of the invention, in one form, and such exemplification is not to be construed as limiting the scope of the invention in any manner.

DETAILED DESCRIPTION OF THE INVENTION

Figure 1:
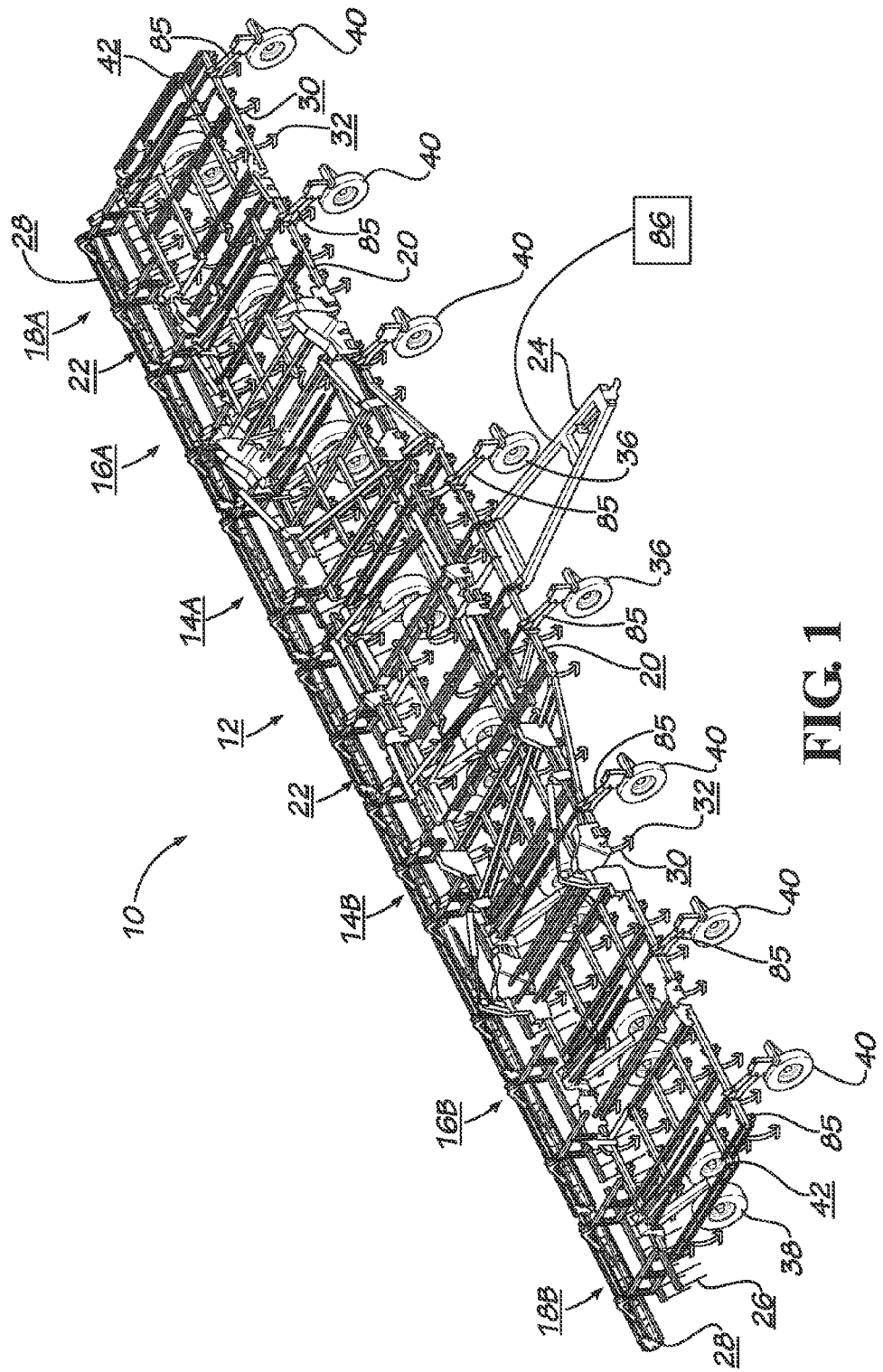
FIG. 1 is a top perspective view of an embodiment of an agricultural tillage implement of the present invention, in the form of a field cultivator, in an unfolded configuration.
Figure 2:
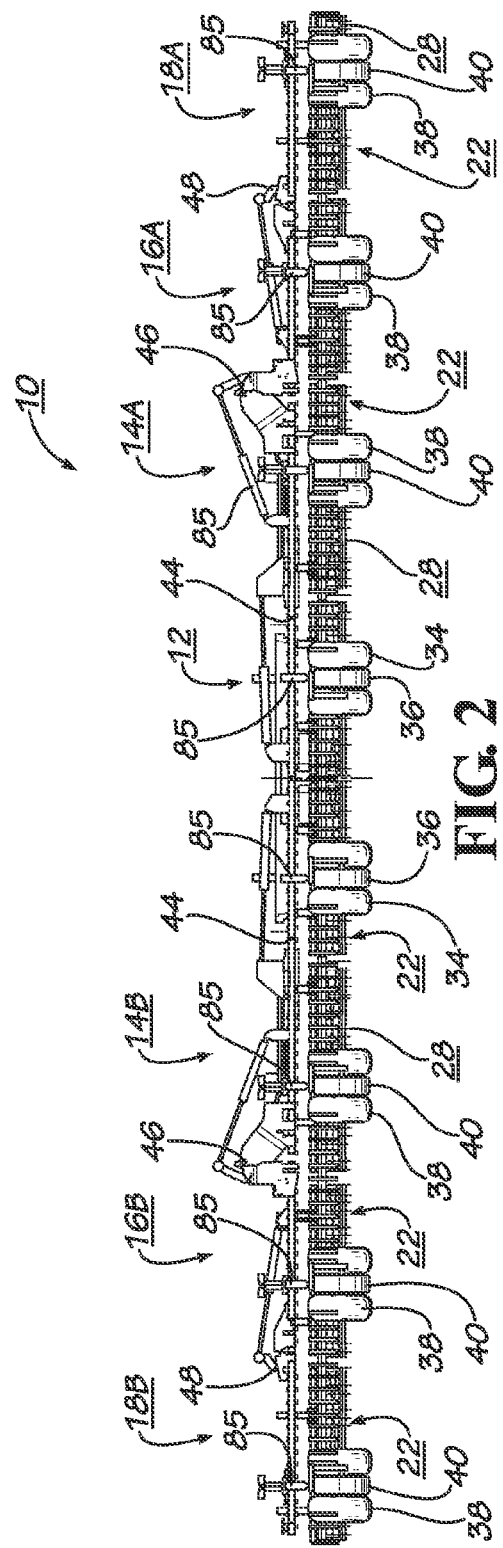
FIG. 2 is a front view of the agricultural tillage implement shown in FIG. 1.

Referring now to the drawings, and more particularly to FIGS. 1 through 8, there is shown an embodiment of an agricultural tillage implement 10 of the present invention. In the illustrated embodiment, the agricultural tillage implement 10 is in the form of a multi-section field cultivator for tilling and finishing soil prior to seeding. The agricultural tillage implement 10 includes a center frame section 12 and a plurality of wing sections 14A, 14B, 16A, 16B, 18A, and 18B. In the illustrated embodiment, the agricultural tillage implement 10 has a triple-fold configuration with three left wings sections designated 14A, 16A and 18A, and three right wing sections designated 14B, 16B and 18B. Wing sections 14A and 14B are each inner wing sections, wing sections 16A and 16B are each middle wing sections, and wing sections 18A and 18B are each outer wing sections.

Center frame section 12 is directly towed by a traction unit, such as an agricultural tractor (not shown). Center frame section 12 generally functions to carry a center shank frame 20 for tilling the soil, and a rear auxiliary implement 22 for finishing the soil. A pull hitch 24 extends forward from center shank frame 20, and is coupled with the traction unit in known manner. Rear auxiliary implement 22 may include a spring tooth drag 26 and a rolling (aka, crumbler) basket 28 which coact with each other to finish the soil. However, rear auxiliary implement 22 can be differently configured, such as a spike tooth drag, cultivator shanks, etc.

Center shank frame 20 generally functions to carry cultivator shanks 30 with shovels 32 at their lower ends for tilling the soil. Center section rear lift wheels 34 are used for raising and lowering the center shank frame 20 with an actuator (not specifically visible in FIGS. 1 through 8), and a pair of center section front gauge wheels 36 are used to level the center shank frame 20 during a field operation. Similarly, each inner wing section 14A and 14B, middle wing section 16A and 16B, and outer wing section 18A and 18B includes a wing shank frame 42 for tilling the soil, a rear auxiliary implement 22 for finishing the soil, wing section rear lift wheels 38 and wing section front gauge wheels 40. These components are slightly different from but still similar to the like-named components described above with regard to center frame section 12, and are not described in further detail herein.

Figure 3:
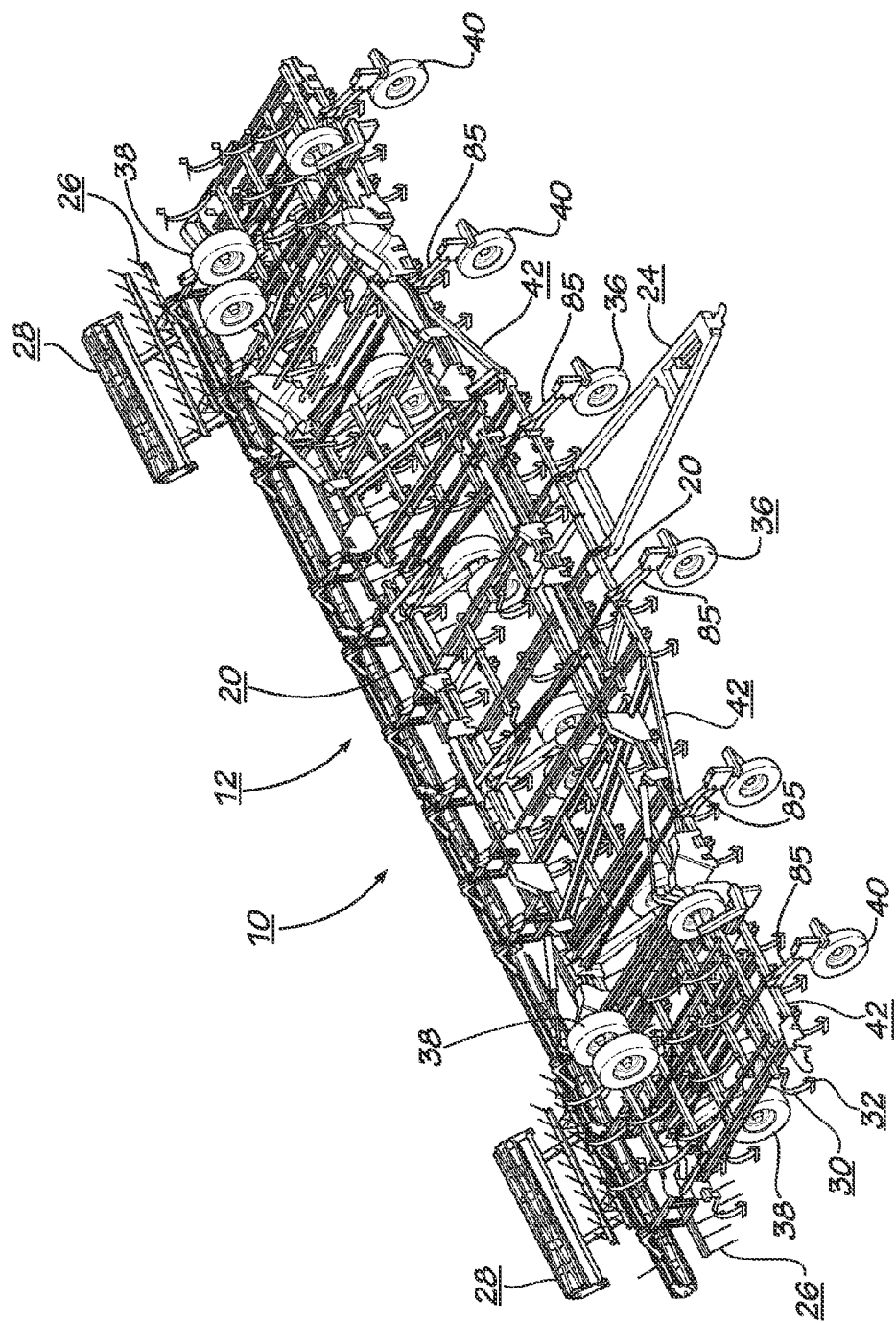
FIG. 3 is a top perspective view of the agricultural tillage implement shown in FIGS. 1 through 2, with the outer wing sections folded to a transport configuration.
Figure 4:
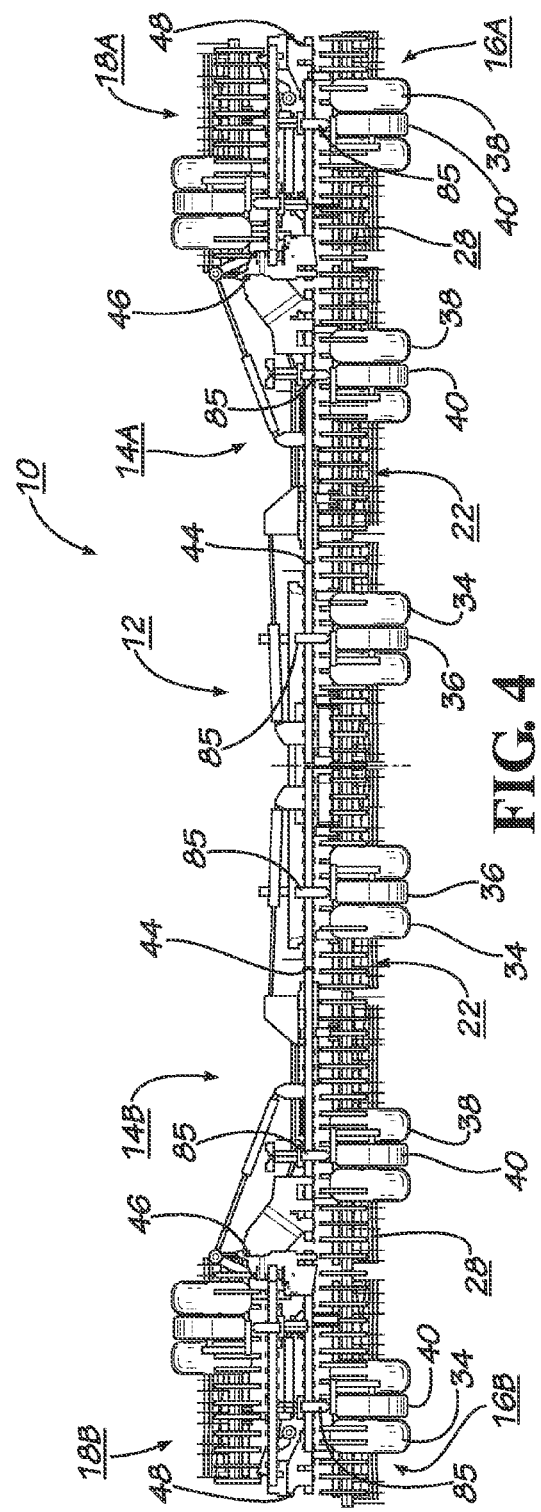
FIG. 4 is a front view of the agricultural tillage implement shown in FIG. 3, with the outer wing sections folded to the transport configuration.
Figure 5:
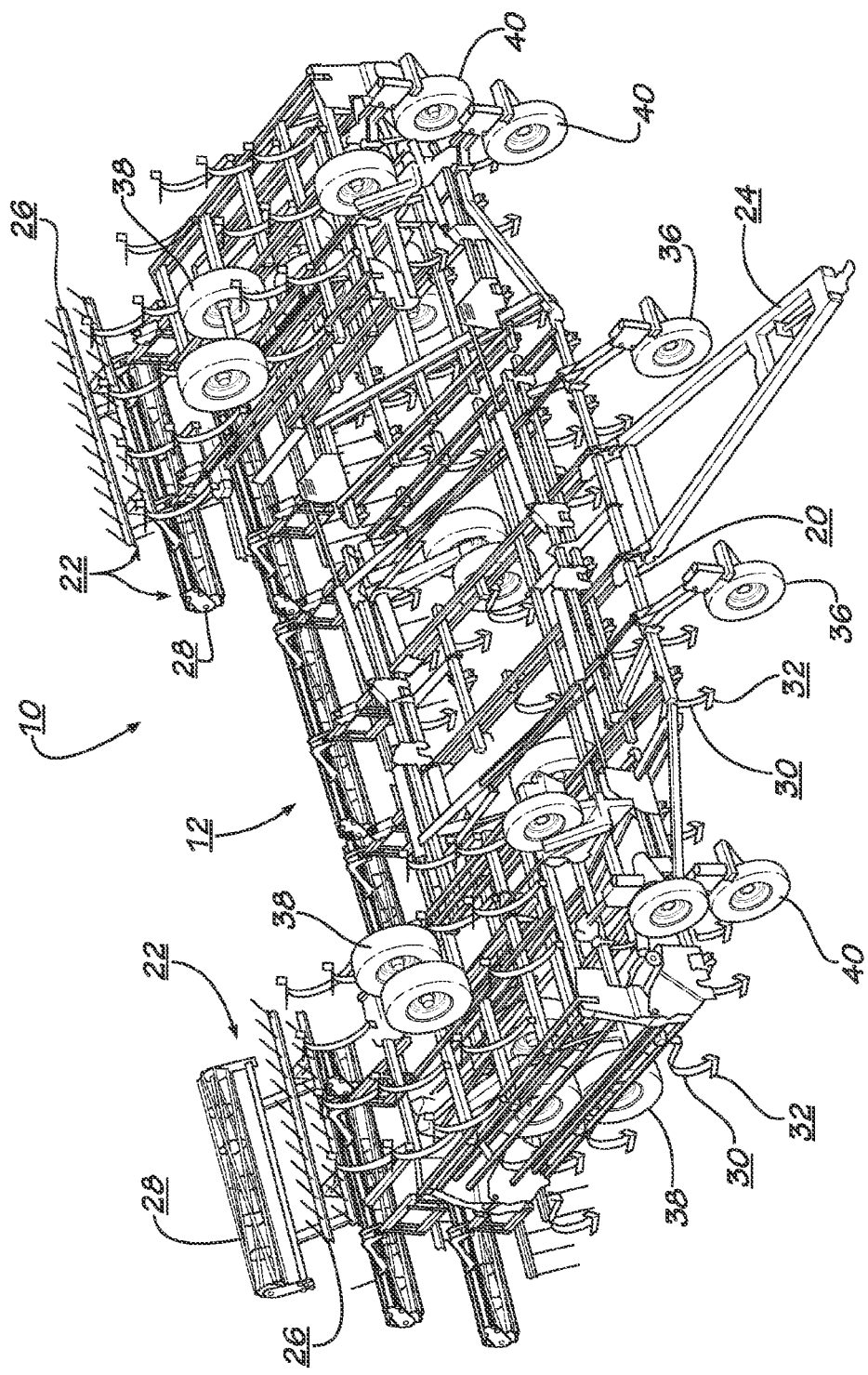
FIG. 5 is a top perspective view of the agricultural tillage implement shown in FIGS. 1 through 4, with the middle wing sections folded to a transport configuration.
Figure 6:
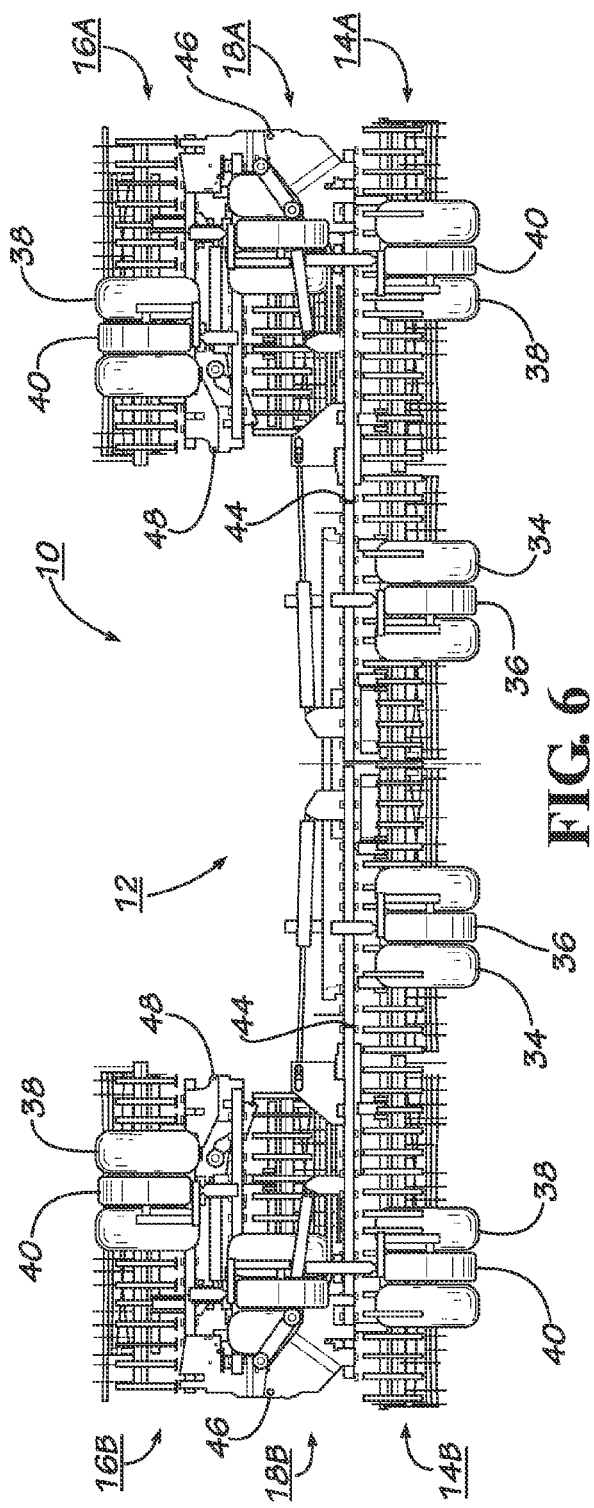
FIG. 6 is a front view of the agricultural tillage implement shown in FIG. 5, with the middle wing sections folded to the transport configuration.
Figure 7:
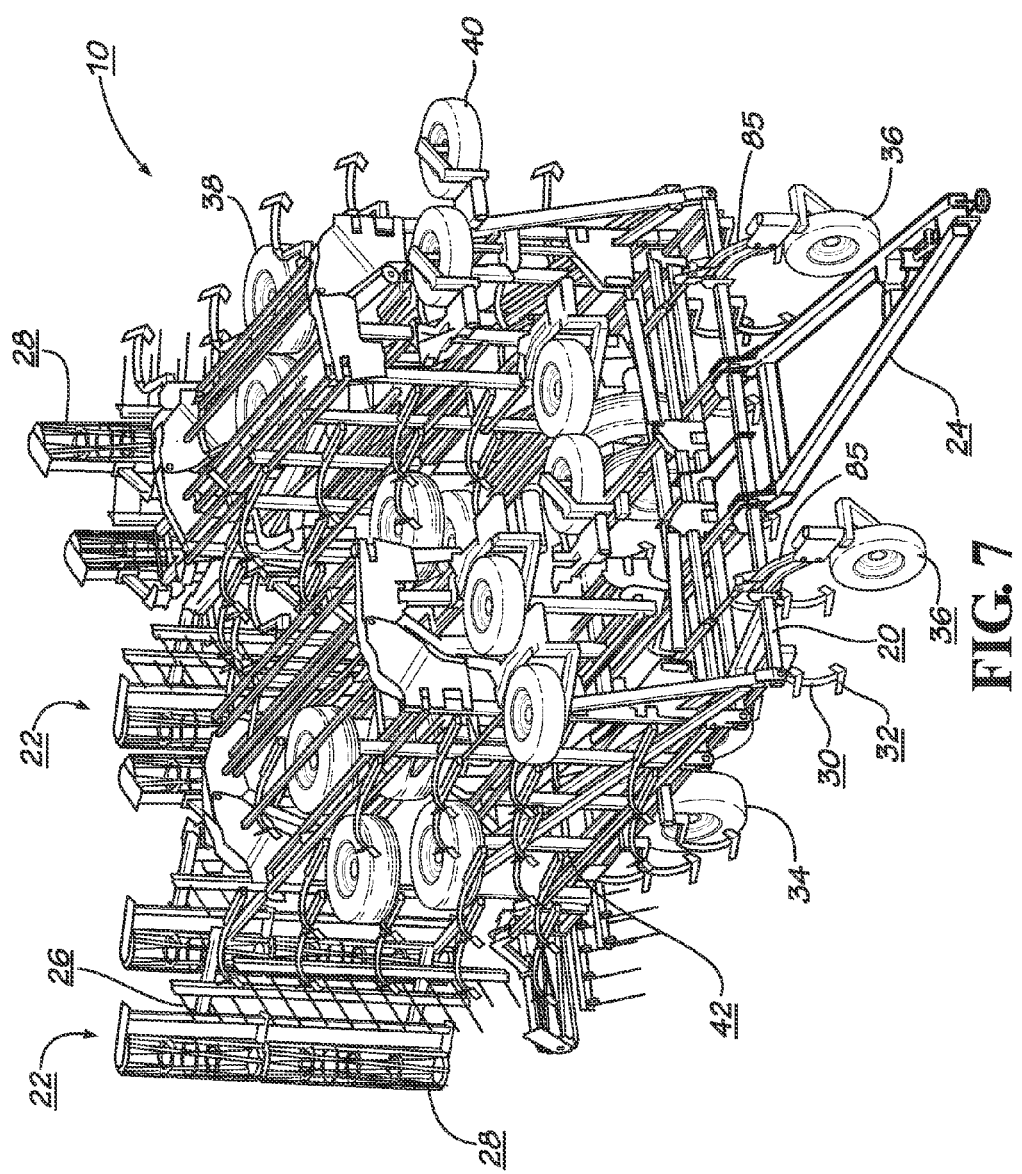
FIG. 7 is a top perspective view of the agricultural tillage implement shown in FIGS. 1 through 6, with the inner wing sections folded to a transport configuration.
Figure 8:
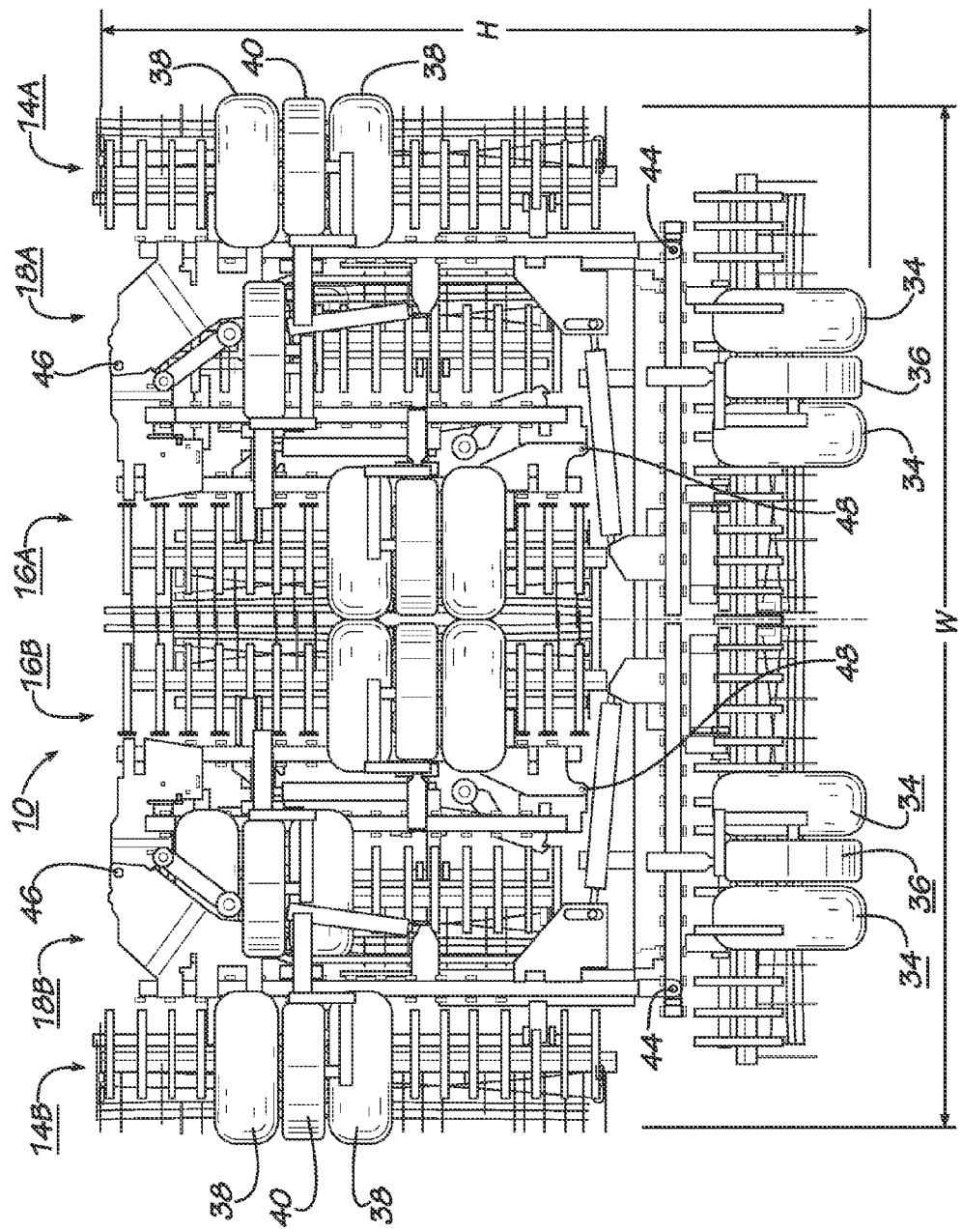
FIG. 8 is a front view of the agricultural tillage implement shown in FIG. 7, with the inner wing sections folded to the transport configuration.

During use, it is periodically necessary to move the agricultural tillage implement 10 from an unfolded (operating) configuration to a folded (transport) configuration. First, each outer wing section 18A and 18B is folded laterally inward and over a respective middle wing section 16A and 16B (FIGS. 3 and 4). With the outer wing sections 18A and 18B in the folded state, each middle wing section 16A and 16B is then folded laterally inward and over a respective inner wing section 14A and 14B (FIGS. 5 and 6). With the middle wing sections 16A and 16B in the folded state, each middle wing section 16A and 16B is then folded laterally inward and over the center frame section 12 (FIGS. 7 and 8). To unfold the agricultural tillage implement 10 and transform back to the field or operating configuration shown in FIGS. 1 and 2, the folding sequence described above is simply reversed.

The outer wing sections 18A and 18B, middle wing sections 16A and 16B, and inner wing sections 14A and 14B are stacked together in a vertically arranged stack over the center frame section 12 when in the folded state. To allow this type of nested stacking configuration, each of the wing sections 14A, 14B, 16A, 16B, 18A, and 18B have a pivot axis. Pivot axes 44 are between inner wing sections 14A and 14B and center frame section 12. Pivot axes 46 are between inner wing sections 14A and 14B and middle wing sections 16A and 16B. Pivot axes 48 are between middle wing sections 16A and 16B and outer wing sections 18A and 18B. Pivot axes 44, 46, and 48 are vertically offset to allow the wing sections to lie flat against the laterally inward center shank frame 20 and center frame section 12 when in the folded state. Pivot axes 46 are vertically higher than pivot axes 44 and 48 when in the unfolded state.

Different countries and states have different regulatory highway requirements concerning oversized vehicles on the road. In the US, some states exempt agricultural equipment from such regulations, while others require that any type of vehicle on a road must comply with the oversized vehicle regulations. In Europe, the regulations may be stricter concerning the height and width of vehicles which may travel on a road without being accompanied by an escort vehicle. With the triple-fold agricultural tillage implement 10 of the present invention, the overall frontal profile dimensions when in the folded state fit within regulatory requirements for both the US and Europe. More particularly, with all of the wing sections 14A, 14B, 16A, 16B, 18A, and 18B in the folded state, the agricultural tillage implement 10 is then in a transport configuration with an overall frontal profile having dimensions with a maximum width "W" of no greater than approximately 20 feet, preferably approximately 18 feet wide, and a height "H" of no greater than approximately 14 feet, preferably approximately 13 feet, 6 inches high (FIG. 8).

These maximum frontal profile dimensions include all of the center shank frames 20, wing shank frames 42, shanks 30, center section rear lift wheels 34, center section front gauge wheels 36, wing section rear lift wheels 38, and wing section front gauge wheels 40 when in the folded state. The rear auxiliary implements 22 are considered to be add-ons to the agricultural tillage implement 10, and may be outside these overall frontal profile dimensions, at least if not folded upwardly for the transport configuration. However, it is the intention that all of the agricultural tillage implement 10, including the rear auxiliary implements 22, be within these maximum frontal profile dimensions when in the transport configuration.

Referring to FIGS. 9 through 12, a section of the agricultural tillage implement 10 is shown including rear lift wheels and front gauge wheels as part of a lift and gauge wheel lift mechanism 85. In these figures, one of wing sections 14, 16, or 18 is shown, bearing wing shank frame 42, wing section rear lift wheels 38, and wing section front gauge wheels 40. However, center section 12 may be similarly configured with center shank frame 20, center section rear lift wheels 34, and center section front gauge wheels 36, such that the lift and gauge wheel lift mechanism 85 hereinafter described is representative of similar lift and gauge wheel lift mechanisms on any of wing sections 14A, 14B, 16A, 16B, 18A, or 18B, or on center section 20. Alternately, center frame section 12 may be provided with rear lift wheels utilizing a traditional lift system or front gauge wheels utilizing a traditional lift system, or both rear lift wheels and front gauge wheels utilizing a traditional lift system, in which case only the wing sections 14A, 14B, 16A, 16B, 18A, and 18B are provided with a lift and gauge wheel lift mechanism 85 as shown in FIGS. 9 through 12. It is further contemplated that other combinations of rear lift wheels and front gauge wheels utilizing a traditional lift system, and lift and gauge wheel lift mechanisms 85 as shown in FIGS. 9 through 12 may be used, such that use of the inventive lift and gauge wheel lift mechanism 85 as disclosed in FIGS. 9 through 12 on any one of or all of center frame section 12 and wing sections 14A, 14B, 16A, 16B, 18A, and 18B are within the scope of the invention. Wing section front gauge wheels 40 are shown as a castor type wheel having an approximately vertical axis of rotation 50, which may be present in any or in all such front gauge wheels in some embodiments.

Wing section rear lift wheels 38 depend from the wing section 14, 16, or 18 on an arm 52 which is pivotably fixed to the bracket 54 by knuckle 56. Bracket 54 is rigidly fixed to the wing section 14, 16, or 18. A rear lift wheel link 58 is similarly pivotably fixed to the knuckle 56 so that translation of rear lift wheel link 58 serves to raise and lower the wing section rear lift wheels 38. Thus, if rear lift wheel link 58 moves generally leftward as viewed, knuckle 56 pivots counter-clockwise within the bracket 54 raising the wing section rear lift wheels 38, and if rear lift wheel link 58 moves generally rightward as viewed, knuckle 56 pivots clockwise within the bracket 54 lowering the wing section rear lift wheels 38.

Figure 10:
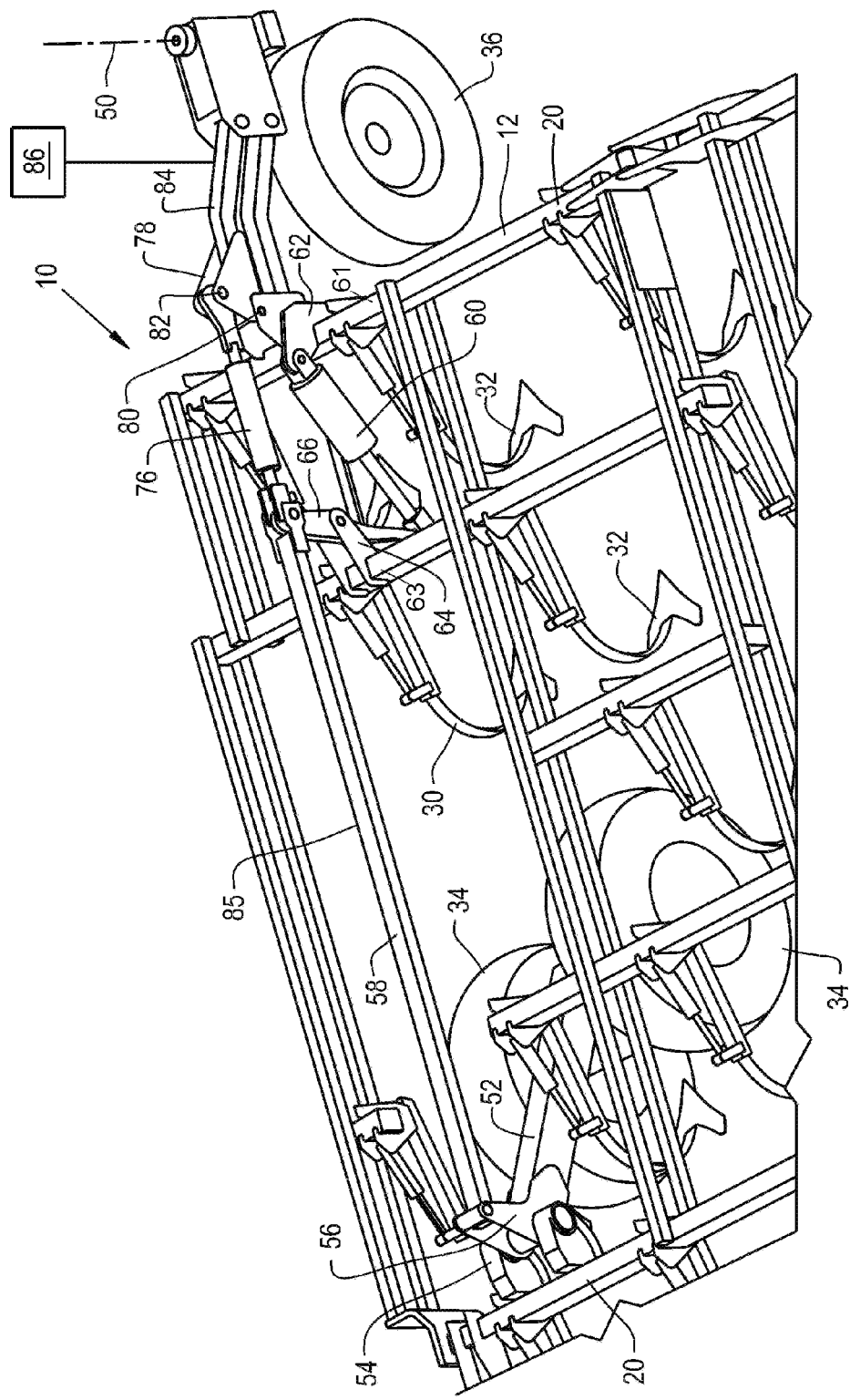
FIG. 10 is an isometric view of a portion of an agricultural tillage implement of FIG. 1, showing the rear lift wheels and the front gauge wheels in a lowered position.
Figure 11:
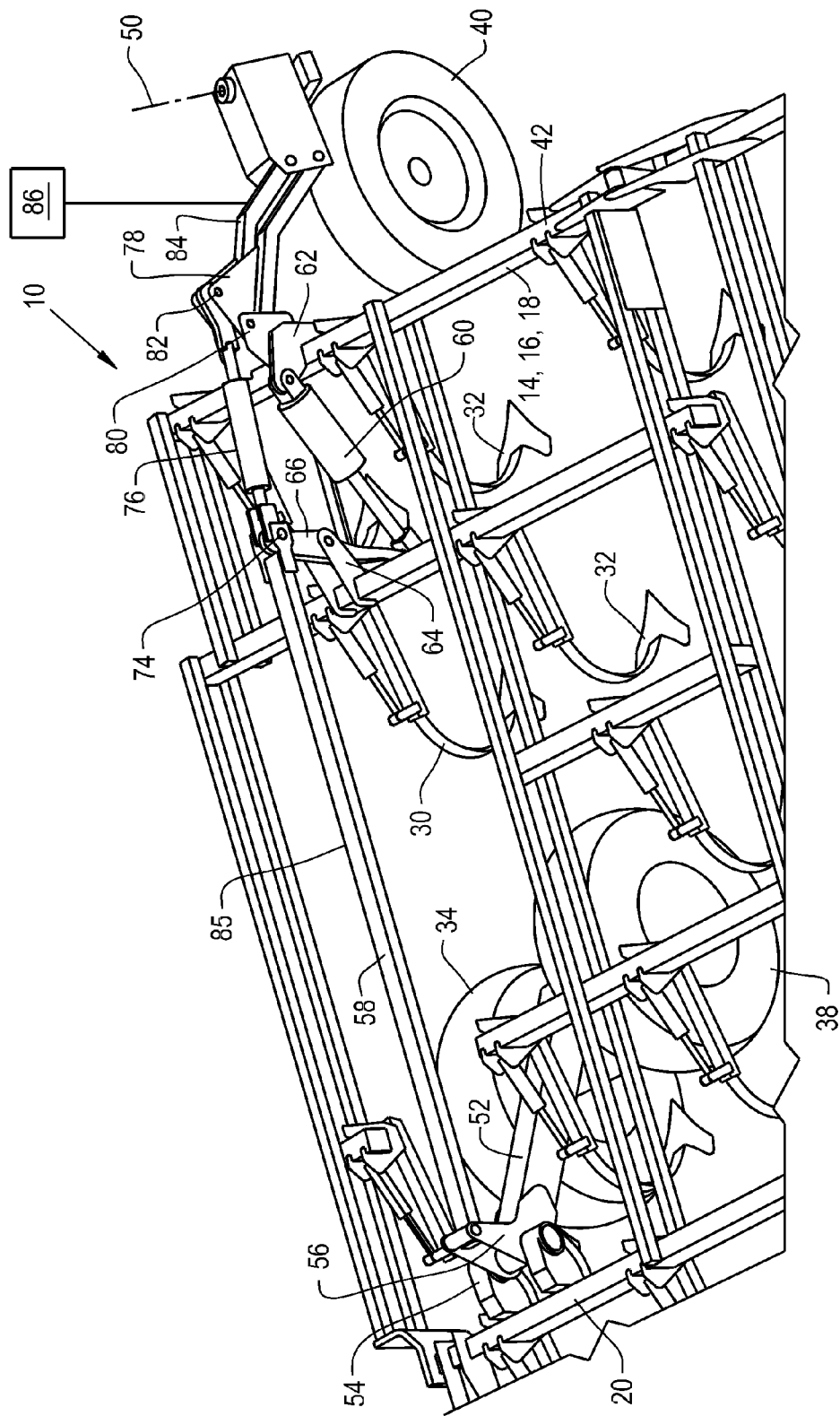
FIG. 11 is an isometric view of a portion of an agricultural tillage implement of FIGS. 1 and 2, showing the front gauge wheels in a further extended position used when levelling the agricultural tillage implement rearward by way of example.
Figure 12:
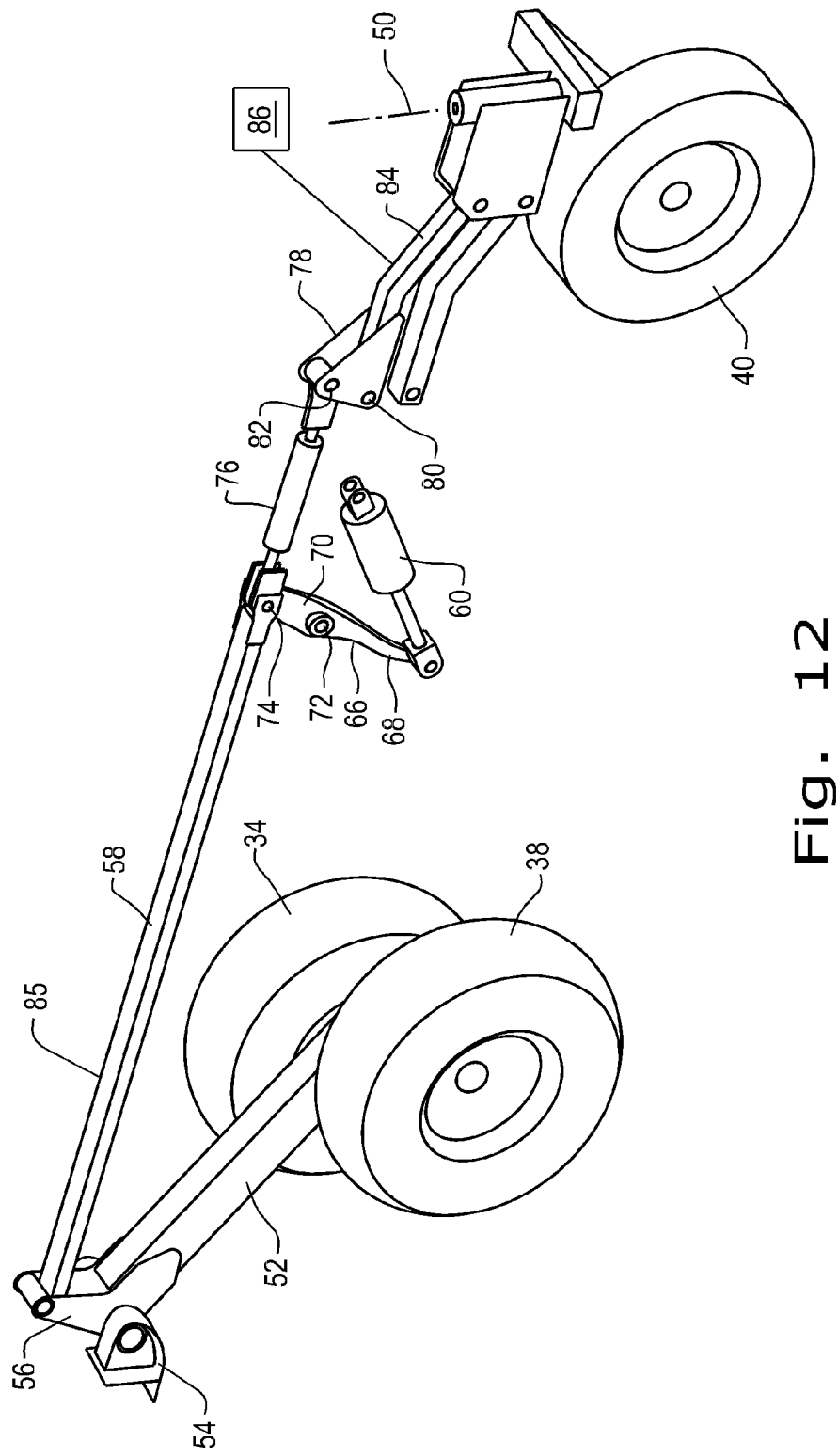
FIG. 12 is an isometric view of an embodiment of the lift and gauge wheel lift mechanism.

Translation of rear lift wheel link 58 is achieved by extending or retracting a rear lift wheel actuator 60, which may comprise a linearly extendable and retractable piston within a hydraulic cylinder. Rear lift wheel actuator 60 is pivotably fixed to a first front frame section 61 of the wing section 14, 16, or 18 by bracket 62, as illustrated in FIG. 10. Located rearwardly thereof is a similar second front frame section 63 having a similar bracket 64 which pivotably supports a rocker link 66. This rocker link 66 may be more clearly seen in FIG. 12 and includes three spaced apart apertures the central one of which is affixed by a pivot pin 72 to bracket 64. The rocker link 66 includes a downwardly depending arm 68 and an upwardly depending arm 70. The hole near the lower end of downwardly depending arm 68 of rocker link 66 is pivotably fixed to the lower end of the rear wheel lift actuator 60. The upwardly depending arm 70 of rocker link 66 has an upper end hole which pivotably engages the rear lift wheel link 58 at pivot pin 74. Thus, when the rear lift wheel actuator 60 is extended, rocker link 66 pivots about pivot pin 72 in a clockwise direction as viewed, drawing rear lift wheel link 58 generally to the right and lowering wing section rear lift wheels 38.

Pivot pin 74 defines a common pivot axis which is shared by the rocker link 66 upwardly depending arm 70, the rearwardly extending rear lift wheel link 58 and a forwardly extending front gauge wheel actuator 76, which may comprise a linearly extendable and retractable piston within a hydraulic cylinder. Front gauge wheel actuator 76 is pivotably coupled to the wing section front gauge wheels 40 by a knuckle 78. The knuckle 78 has a pivot axis defined by pivot pin 80 which is fixed relative to the wing section 14, 16, or 18. A second pivot axis defined by pivot pin 82 is displaced from pivot pin 80 and receives the front gauge wheel actuator 76. A set of parallel arms 84 extends from the knuckle 78 to wing section front gauge wheels 40.

Figure 9:
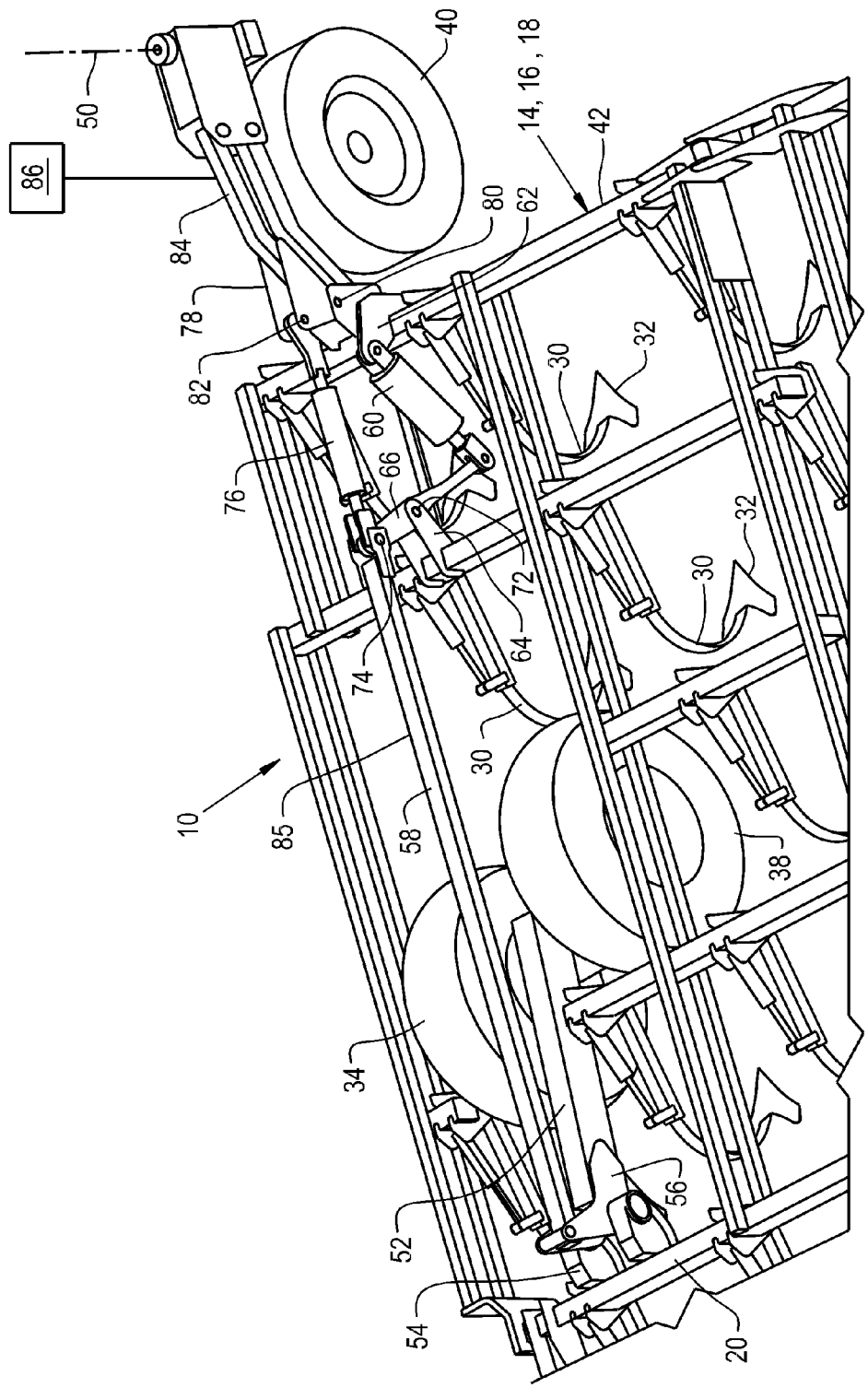
FIG. 9 is an isometric view of a portion of an agricultural tillage implement incorporating an embodiment of the invention in one form showing the rear lift wheels and the front gauge wheels in a retracted position.

As noted previously, one such lift and gauge wheel lift mechanism 85 is shown in FIG. 9, comprised of wing section rear lift wheels 38, arm 52, knuckle 56, rear lift wheel link 58, rocker link 66, rear lift wheel actuator 60, front gauge wheel actuator 76, knuckle 78, parallel arms 84, and wing section front gauge wheels 40. In the agricultural tillage implement 10 embodiment shown in FIGS. 1 through 8, multiple such lift and gauge wheel lift mechanisms 85 are utilized, including two for the center section rear lift wheels 34 and center section front gauge wheels 36 of the center frame section 12, and one each for the wing section rear lift wheels 38 and wing section front gauge wheels 40 of the wing sections 14A, 14B, 16A, 16B, 18A, and 18B. Alternately, other combinations of lift and gauge wheel lift mechanisms 85 and traditional rear lift wheel and front gauge wheel lift mechanisms may be used, such that the inventive lift and gauge wheel lift mechanism 85 may appear on any one of or all of center frame section 12 and wing sections 14A, 14B, 16A, 16B, 18A, and 18B.

Figure 13:
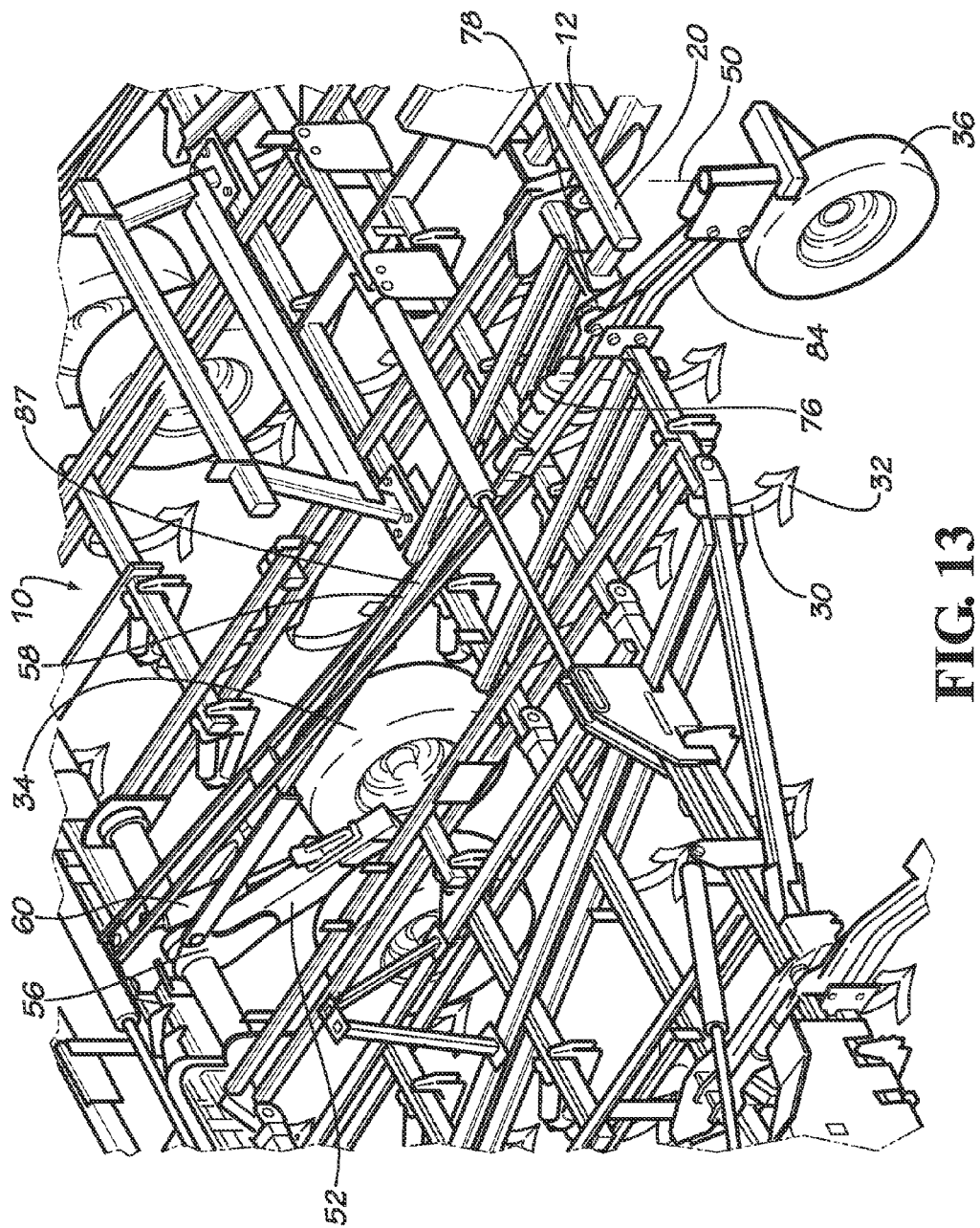
FIG. 13 is an isometric view of a portion of an agricultural tillage implement incorporating another embodiment of the invention.

FIG. 13 shows another embodiment of a lift and gauge wheel lift mechanism 87 on the agricultural tillage implement 10. In this figure, center frame section 12 is shown, bearing center shank frame 20, center section rear lift wheels 34, and center section front gauge wheels 36. However, lift and gauge wheel lift mechanism 87 shown in FIG. 13 may be representative of such alternative embodiment as may be employed in place of the lift and gauge wheel lift mechanism 85 shown in FIGS. 9 through 12 on any of center frame section 12 and wing sections 14A, 14B, 16A, 16B, 18A, and 18B. In this way, the center frame section 12 and wing sections 14A, 14B, 16A, 16B, 18A, and 18B may use any combination of lift and gauge wheel lift mechanism 85, lift and gauge wheel lift mechanism 87, or traditional lift systems. Center section front gauge wheels 36 are again shown as castor type wheels having an approximately vertical axis of rotation 50, which may be present in any or in all such front gauge wheels in some embodiments.

Center section rear lift wheels 34 depend from a rearward frame section 35 of the center frame section 12 via a rearward linkage assembly, which includes an arm 52 which is attached to a knuckle 56 which is pivotably connected to a portion of the rearward frame section 35. The rearward linkage assembly also includes a rear lift wheel link 58. A rear lift wheel actuator 60, which may comprise a linearly extendable and retractable piston within a hydraulic cylinder, is attached to arm 52 via the rear lift wheel link 58 and the knuckle 56, and to rearward frame section 35 of center frame section 12, and serves to raise and lower center section rear lift wheels 34. The rear lift wheel link 58 is pivotably fixed to the knuckle 56 and to front gauge wheel actuator 76, which may also comprise a linearly extendable and retractable piston within a hydraulic cylinder. Front gauge wheel actuator 76, in turn, is connected to knuckle 78, which actuates parallel arms 84 connected to center section front gauge wheels 36.

When rear lift wheel actuator 60 lowers center section rear lift wheels 34 by rotating arm 52 clockwise as viewed in FIG. 13, knuckle 56 also rotates clockwise, causing rear lift wheel link 58 to translate forward, causing knuckle 78 to rotate clockwise. This lowers center section front gauge wheels 36 by means of parallel arms 84. In opposite fashion, when rear lift wheel actuator 60 raises center section rear lift wheels 34 by rotating arm 52 counter-clockwise as viewed in FIG. 13, knuckle 56 also rotates counter-clockwise, causing rear lift wheel link 58 to translate rearward, causing knuckle 78 to rotate counter-clockwise. This raises center section front gauge wheels 36 by means of parallel arms 84. Meanwhile, front gauge wheel actuator 76 can independently raise and lower center section front gauge wheels 36. In this way, operation of lift and gauge wheel lift mechanism 87 shown in FIG. 13 is analogous to the operation of lift and gauge wheel lift mechanism 85 shown in FIGS. 9 through 12. Specifically, extension and retraction of rear lift wheel actuator 60 causes both center section rear lift wheels 34 and center section front gauge wheels 36 to raise and lower, whereas extension and retraction of front gauge wheel actuator 76 additionally raises and lowers only center section front gauge wheels 36.

Each rear lift wheel actuator 60 and each front gauge wheel actuator 76 of each lift and gauge wheel lift mechanism 85 or lift and gauge wheel lift mechanism 87 on the agricultural tillage implement 10 embodied in FIGS. 1 through 8 may be position sensing cylinders, or may otherwise be provided with feedback devices integrated with the rear lift wheel actuators 60 and front gauge wheel actuators 76. Alternately, such feedback devices may be configured to provide position feedback on the lift and gauge wheel lift mechanism 85 directly. Such position sensing cylinders embodied in rear lift wheel actuators 60 and front gauge wheel actuators 76, or such feedback devices, are connected to a control system 86, which is shown abstractly in the figures.

Control system 86 is operable to cause rear lift wheel actuators 60 and front gauge wheel actuators 76 to extend or contract as appropriate to adjust the depth of tillage, the front to rear levelling of the agricultural tillage implement 10, and the side to side levelling of the agricultural tillage implement 10. Further, the control system 86 is operable to orchestrate the movement of center section rear lift wheels 34, the center section front gauge wheels 36, the wing section rear lift wheels 38, and the wing section front gauge wheels 40 during the transition to and from the operating and transport configurations.

More specifically, to lower the agricultural tillage implement 10, and thereby increase the depth of the shovels 32 of the cultivator shanks 30, rear lift wheel actuator 60 is retracted on each lift and gauge wheel lift mechanism 85 on at least one of the center frame section 12 and wing sections 14A, 14B, 16A, 16B, 18A, and 18B. To raise the agricultural tillage implement 10, and thereby decrease the depth of the shovels 32 of the cultivator shanks 30, rear lift wheel actuator 60 is extended on each lift and gauge wheel lift mechanism 85 on at least one of the center frame section 12 and wing sections 14A, 14B, 16A, 16B, 18A, and 18B. To level the agricultural tillage implement 10 front to rear, with the rear lift wheel actuator 60 generally extended, the front gauge wheel actuator 76 is extended somewhat to increasingly tilt the agricultural tillage implement 10 rearward, or retracted somewhat to increasingly tilt the agricultural tillage implement 10 forward. To level the agricultural tillage implement 10 side to side, rear lift wheel actuators 60 on at least one of the center frame section 12 and wing sections 14A, 14B, 16A, 16B, 18A, and 18B are extended or retracted in proportion to the distance of each lift and gauge wheel lift mechanism 85 from the centerline of the agricultural tillage implement 10, those on the left retracting when those on the right are extending, or vice versa. These several adjustments may be made dynamically while the agricultural tillage implement 10 is in use, such that the individual and collective center shank frames and wing shank frames adjust for depth and react to undulating and rolling terrain.

Also, as the agricultural tillage implement 10 is transitioned from the operating configuration to the transport configuration and the wing sections 14A, 14B, 16A, 16B, 18A, and 18B are being folded together, control system 86 causes wing section rear lift wheels 38 and the wing section front gauge wheels 40 to go from the fully extended position to being partially retracted. This effectively lowers the profile of each wing section 14A, 14B, 16A, 16B, 18A, and 18B as the particular wing section is folded. The process is reversed when the agricultural tillage implement 10 transitions from the transport configuration to the field configuration.

While control system 86 may be a set of valves manually controlled by an operator, it is contemplated that control system 86 would be an electronic control system. The control system 86 may be an electrical processing circuit (EPC), which EPC may be configured as any type of suitable processor, such as a digital controller, an analog processor, hardwired components, or an application specific integrated circuit (ASIC). Alternately, the control system 86 may be generally hydraulic in nature.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural tillage implement, comprising:
a center frame section including a pull hitch extending in a travel direction;
a plurality of foldable wing sections coupled with the center frame section;
a plurality of ground engaging tilling elements individually coupled to one of the center frame section and to the plurality of foldable wing sections; and
a plurality of lift and gauge wheel lift mechanisms, each lift and gauge wheel lift mechanism including
a rearward linkage assembly coupled to a rearward frame section, the rearward linkage assembly including a rearward knuckle connector, an arm, and a lift linkage, the rearward knuckle connector pivotably connected to a portion of the rearward frame section, the rearward knuckle connector carrying an arm supporting at least one rear lift wheel, and the rearward knuckle connector coupled to one end of the lift linkage;
a rear lift wheel actuator operably coupled at one end thereof to a first front frame section;
a rocker link pivotably coupled (a) at an upper end thereof to an opposite end of the lift linkage, (b) at a lower end thereof to an opposite end of the rear lift wheel actuator, and (c) at a middle portion thereof to a portion of a second front frame section;
a front gauge wheel actuator pivotably coupled to (a) the opposite end of the lift linkage, (b) the upper end of the rocker link, and (c) a front gauge wheel knuckle connector; and
the front gauge wheel knuckle connector pivotably connected to a portion of the first front frame section and to at least one parallel arm of a pair of parallel arms, the pair of parallel arms supporting a front gauge wheel.

2. The agricultural tillage implement of claim 1, wherein: said plurality of lift and gauge wheel lift mechanisms includes at least one lift and gauge wheel lift mechanism associated with said center frame section.

3. The agricultural tillage implement of claim 1, wherein: said plurality of lift and gauge wheel lift mechanisms includes at least one lift and gauge wheel lift mechanism associated with each of said plurality of foldable wing sections.

4. The agricultural tillage implement of claim 1, further comprising:
a control system connected to said rear lift wheel actuators and to said front gauge wheel actuators.

5. The agricultural tillage implement of claim 4, wherein: said control system is operable to control a depth of said ground engaging tilling elements by raising and lowering at least one of said center frame section and said plurality of foldable wing sections by extending and retracting said rear lift wheel actuators.

6. The agricultural tillage implement of claim 4, wherein: said control system is operable to level front to rear at least one of said center frame section and said plurality of foldable wing sections.

7. The agricultural tillage implement of claim 4, wherein: said control system is operable to level side to side said agricultural tillage implement.

8. The agricultural tillage implement of claim 4, wherein: said control system is operable to actuate said rear lift wheel actuators and said front gauge wheel actuators to effect a profile minimizing operation of said plurality of foldable wing sections when said implement is being put into a transport configuration.

9. The agricultural tillage implement of claim 4, wherein: each of said rear lift wheel actuators and said front gauge wheel actuators are independently extendable and retractable.

10. The agricultural tillage implement of claim 9, wherein:
each of said rear lift wheel actuators and said front gauge wheel actuators are position sensing cylinders.

11. A lift and gauge wheel lift mechanism for an agricultural tillage implement, comprising:
a rearward linkage assembly coupled to a rearward frame section, the rearward linkage assembly including a rearward knuckle connector, an arm, and a lift linkage, the rearward knuckle connector pivotably connected to a portion of the rearward frame section, the rearward knuckle connector carrying the arm which supports at least one rear lift wheel, and the rearward knuckle connector coupled to the lift linkage;
a rear lift wheel actuator operably coupled to a first front frame section;
a rocker link pivotably coupled to (a) the lift linkage, (b) the rear lift wheel actuator, and (c) a portion of a second front frame section;
a front gauge wheel actuator pivotably connected to (a) the lift linkage, (b) the rocker link, and (c) a front gauge wheel knuckle connector; and
the front gauge wheel knuckle connector pivotably connected to a portion of the first front frame section and to at least one parallel arm of a pair of parallel arms, the pair of parallel arms supporting a front gauge wheel, and
a control system connected to the rear lift wheel actuator and to the front gauge wheel actuator.

12. The lift and gauge wheel lift mechanism for an agricultural tillage implement of claim 11, wherein:
said control system is operable to control a depth of at least one ground engaging tilling element connected to the agricultural tillage implement by raising and lowering the agricultural tillage implement by extending and retracting said rear lift wheel actuator.

13. The lift and gauge wheel lift mechanism for an agricultural tillage implement of claim 11, wherein:
said control system is operable to level front to rear the agricultural tillage implement by extending and retracting said front gauge wheel actuator.

14. The lift and gauge wheel lift mechanism for an agricultural tillage implement of claim 11, wherein:
said control system is operable to level side to side the agricultural tillage implement.

15. The lift and gauge wheel lift mechanism for an agricultural tillage implement of claim 11, wherein:
each of said rear lift wheel actuator and said front gauge wheel actuator are independently extendable and retractable.

16. The lift and gauge wheel lift mechanism for an agricultural tillage implement of claim 15, wherein:
each of said rear lift wheel actuator and said front gauge wheel actuator are position sensing cylinders.

* * * * *